US012573827B2

(12) United States Patent     (10) Patent No.:   US 12,573,827 B2

Lu et al.     (45) Date of Patent:    Mar. 10, 2026

(54) THREADING SEALING BOX

(71) Applicant: Sungrow Power Supply Co., Ltd., Hefei (CN)

(72) Inventors: Yu Lu, Hefei (CN); Wenhao Li, Hefei (CN); Yonghong Li, Hefei (CN)

(73) Assignee: Sungrow Power Supply Co., Ltd., Hefei (CN)

( * ) Notice: Subject to any disclaimer, the term of this patent is extended or adjusted under 35 U.S.C. 154(b) by 175 days.

(21) Appl. No.: 18/563,696

(22) PCT Filed: May 26, 2022

(86) PCT No.: PCT/CN2022/095219

§ 371 (c)(1),
(2) Date: Nov. 22, 2023

(87) PCT Pub. No.: WO2023/010959

PCT Pub. Date: Feb. 9, 2023

(65) Prior Publication Data

US 2024/0305079 A1     Sep. 12, 2024

(30) Foreign Application Priority Data

Aug. 6, 2021    (CN) .......................... 202121832445.8

(51) Int. Cl.
*H02G 3/08*       (2006.01)
*H02G 3/18*       (2006.01)

(52) U.S. Cl.
CPC .............. *H02G 3/088* (2013.01); *H02G 3/18* (2013.01)

(58) Field of Classification Search
CPC ............. H02G 3/08; H02G 3/088; H02G 3/18
(Continued)

(56) References Cited

U.S. PATENT DOCUMENTS 9,190,820 B2   11/2015   Nurmi et al.
2024/0036281 A1*   2/2024   Moreira ............... G02B 6/4454

FOREIGN PATENT DOCUMENTS

CN     102767646 A    11/2012
CN     205622168 U    10/2016
(Continued)

OTHER PUBLICATIONS

EPO, EP App. No. 22851676.1 Extended European Search Report, 9 pages, Jun. 27, 2025.

*Primary Examiner* — Tremesha W Burns

(74) *Attorney, Agent, or Firm* — Woodard, Emhardt, Henry, Reeves & Wagner, LLP

(57) ABSTRACT

A threading sealing box includes a box body and a threading assembly, and an opening is formed in the box body, a mounting groove is formed in a side wall of the box body, the threading assembly comprises a threading plate assembly and a threading body, the threading plate assembly is slidably arranged in the mounting groove so as to slide into or slide out of the mounting groove, a penetrating hole is formed in the threading plate assembly, the threading body is arranged on the threading plate assembly, and the threading body communicates with the penetrating hole. A cable penetrating through the threading body can be circumferentially sealed by the threading body, thereby effectively reducing the water leakage risk; the cable does not need to be locked by using accessories such as a waterproof terminal, such that the operation is simple.

18 Claims, 7 Drawing Sheets

(58) Field of Classification Search
USPC .......................................................... 174/50
See application file for complete search history.

(56) References Cited

FOREIGN PATENT DOCUMENTS

| CN | 210395003 U | 4/2020 |
| CN | 215872158 U | 2/2022 |
| DE | 102014114568 A1 | 4/2016 |
| EP | 1744425 B1 | 5/2019 |
| EP | 3840150 A1 | 6/2021 |
| JP | 2000106795 A | 4/2000 |
| JP | 2009039507 A | 2/2009 |

* cited by examiner

THREADING SEALING BOX

The present application is a National Phase entry of PCT Application No. PCT/CN2022/095219, filed on May 26, 2022, which claims priority to Chinese Patent Application No. 202121832445.8, titled "THREADING SEALING BOX", filed on Aug. 6, 2021 with the China National Intellectual Property Administration, which are incorporated herein by reference in their entireties.

FIELD

The present application relates to the technical field of cable connectors, and in particular to threading sealing box.

BACKGROUND

With the development of technology, the power levels of inverters in the market are higher and higher, and correspondingly, cables are made thicker and thicker. Currently, cable wiring in the market mainly uses waterproof terminals for installation and protection. Since the cable is thick, sizes and specifications of waterproof terminals are getting larger and larger, and the required tightening force also increases. Tools are required for installation and removal, and operation is inconvenient. When multiple cables are threading, multiple waterproof terminals are required to be mounted, which requires a large mounting space. The cost is high and the mounting time is long. When a cable is installed, a tightening nut of the waterproof terminal is required to be unscrewed first, the cable passes through a sealing body, and then a tool is used to fasten the tightening nut to lock the cable. The operation is complicated, and there is a risk of water leakage due to the tightening nut is not fastened in place.

A cable connector is usually located at the bottom of a machine. When components on the cable or wiring side are maintained, if the cable is too thick to bend, the machine is required to be lifted to remove the cable after the waterproof terminal is unscrewed, which is inconvenient to operate.

SUMMARY

The object of the present application is to provide a threading sealing box that can simplify the operation steps during cable wiring, shorten the mounting time, and save the mounting space without using a waterproof terminal. A cable can be pulled out of a box along with a threading plate, without lifting a machine for taking out the cable, which is convenient to operate and saves manpower.

To achieve the object, the present application adopts the following technical solutions:

A threading sealing box includes:
a box body having an opening; and
a threading assembly,
and a mounting slot is formed in a side wall of the box body, the threading assembly includes a threading plate assembly and a threading body, and the threading plate assembly is slidably arranged in the mounting slot to slide in or out of the mounting slot, a threading hole is formed in the threading plate assembly, the threading body is arranged on the threading plate assembly, the threading body is communicated with the threading hole, and the threading body is configured to circumferentially seal a cable passing through the threading body.

In an embodiment, the threading body is of an end sealing structure, and a diameter of the threading body gradually decreases from an end close to the threading plate assembly to an end away from the threading plate assembly.

In an embodiment, a locking line ring is provided on an outer periphery of the threading body, and the locking line ring is elastic.

In an embodiment, the number of the locking line ring is at least two, and the at least two locking line rings are distributed along an axial direction of the threading body.

In an embodiment, multiple threading holes are formed in the threading plate assembly, and each of the multiple threading holes is provided with one threading body correspondingly.

In an embodiment, diameters of an end, which is close to the threading plate assembly, of at least two threading bodies of the multiple threading bodies are different, and the diameter of the end, which is close to the threading plate assembly, of the threading body is greater than a diameter of the corresponding threading hole.

In an embodiment, the threading assembly further includes a sealing sleeve, the sealing sleeve is arranged on the threading plate assembly, one of the threading body and the sealing sleeve is arranged on an outer side of the box body, the other of the threading body and the sealing sleeve is arranged on an inner side of the box body, the sealing sleeve corresponds to the threading body and is communicated with the threading body, a diameter of the sealing sleeve gradually decreases from an end close to the threading plate assembly to an end away from the threading plate assembly.

In an embodiment, the threading plate assembly includes a threading plate body, the threading plate body is slidably arranged in the mounting slot, and the threading body is arranged on the threading plate body.

In an embodiment, the threading plate assembly includes:
a mounting plate slidably arranged in the mounting slot; and
a threading plate body, mounted on the mounting plate and corresponding to the through hole,
and a through hole is formed in the mounting plate, and the threading body is arranged on the threading plate body.

In an embodiment, the threading plate body includes:
a threading plate body skeleton; and
a coating layer, wrapped on an outer surface of the threading plate body skeleton, and the coating layer is integrally formed with the threading body and the sealing sleeve.

In an embodiment, the threading sealing box further includes:
a cover plate covering the opening of the box body.

The beneficial effects of the present application are as follows.

The threading sealing box according to the present application includes the box body and the threading assembly. The mounting slot is formed in the side wall of the box body. The threading assembly includes the threading plate assembly and the threading body. The threading plate assembly is slidably arranged in the mounting slot to slide in or out of the mounting slot. The threading hole is formed in threading plate assembly. The threading body is arranged on the threading plate assembly. The threading body is communicated with the threading hole, and the threading body is configured to circumferentially seal the cable passing through the threading body, effectively reducing the risk of water leakage. There is no need to use a waterproof terminal and other accessories to lock the cable. The operation is simple, and the mounting space is small. More cables can be mounted in the same space, effectively reducing the wiring cost of the cable. The cable can be removed without lifting the machine, reducing carrying and lifting operations and saving labor costs.

Figure 1:
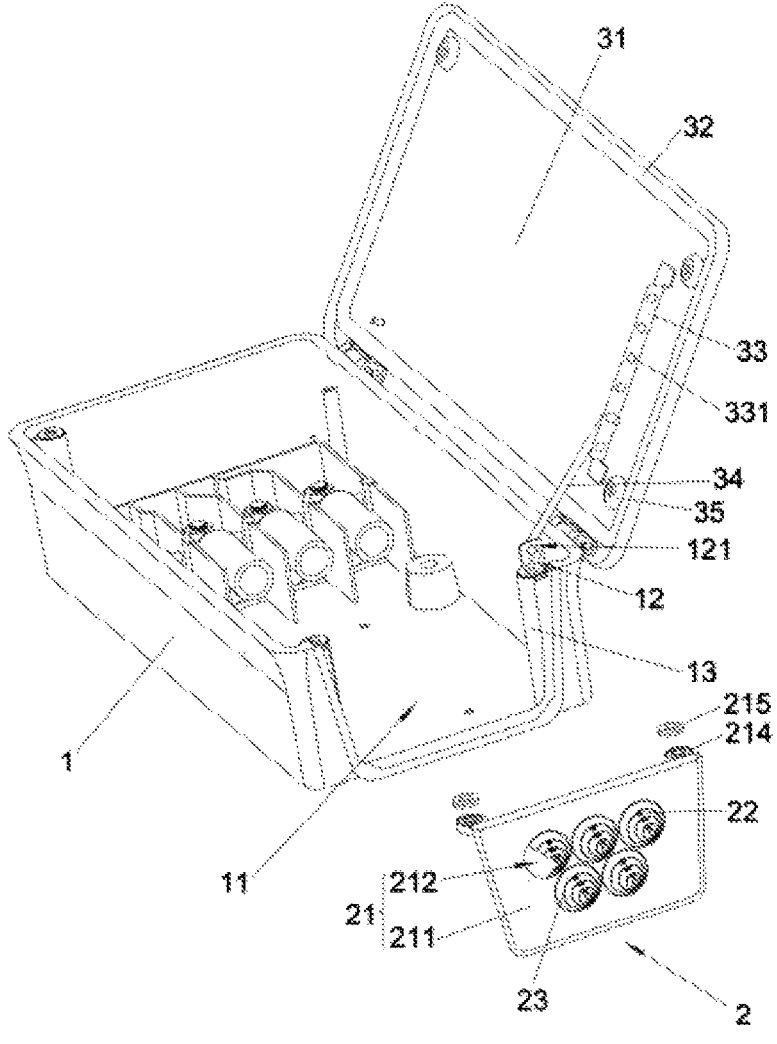
FIG. 1 is a first schematic structural diagram of a threading sealing box according to Embodiment 1 of the present application.

The reference signs in the picture are listed as follows:
1. box body; 11. mounting slot; 12. second positioning plate; 121. second positioning hole; and 13. connector;
2. threading assembly; 21. threading plate assembly; 211. threading plate body; 212. threading hole; 213. mounting plate; 2131. through hole; 214. bump; 215. gasket; 22. threading body; 23. locking line ring; and 24. sealing sleeve; and
31. cover plate; 32. seal; 33. first positioning plate; 331. first positioning hole; 34. positioning pin; and 35. protrusion.

DETAILED DESCRIPTION OF EMBODIMENTS

The present application is further described in detail below in conjunction with the drawings and embodiments. It can be understood that, the specific embodiments described here are only used to explain the present application, but not to limit the present invention. In addition, it should be noted that, for the convenience of description, only some related to the present application rather than all structures are shown in the drawings.

In the description of the present application, unless otherwise clearly specified and limited, terms "connect to", "connect", and "fix" should be understood in a broad sense, for embodiment, may be a fixed connection, a detachable connection, or an integrated connection; may be a mechanical connection or an electric connection; may be a direct connection, or an indirect connection through an intermediary, and may be an internal connection of two elements or an interaction relationship between two elements. For those skilled in the art, the specific meanings of the terms in the present application can be understood based on specific situations.

In the present application, unless otherwise clearly specified and limited, a first feature being "on" or "under" a second feature may include the first feature directly contacting the second feature, and may also include the first feature not directly contacting the second feature but contacting through another feature between the first and second features. Moreover, the first feature being "on", "above" and "over" the second feature includes that the first feature is directly above and obliquely above the second feature, or simply indicates that the first feature is horizontally higher than the second feature. The first feature being "below", "under" and "beneath" the second feature includes that the first feature is directly below and obliquely below the second feature, or simply indicates that the first feature is horizontally lower than the second feature.

In the description of the embodiments, terms "up", "down", "right" and other orientations or positional relationships are based on the orientations or positional relationships shown in the drawings, and are only for the convenience of description and simplification of operations, rather than indicating or implying that devices or elements must have specific orientations, or must be constructed and operated in specific orientations, and thus should not be understood as limitations to the present application. In addition, terms "first" and "second" are only used to distinguish in description and have no special meaning.

Embodiment 1

Figure 2:
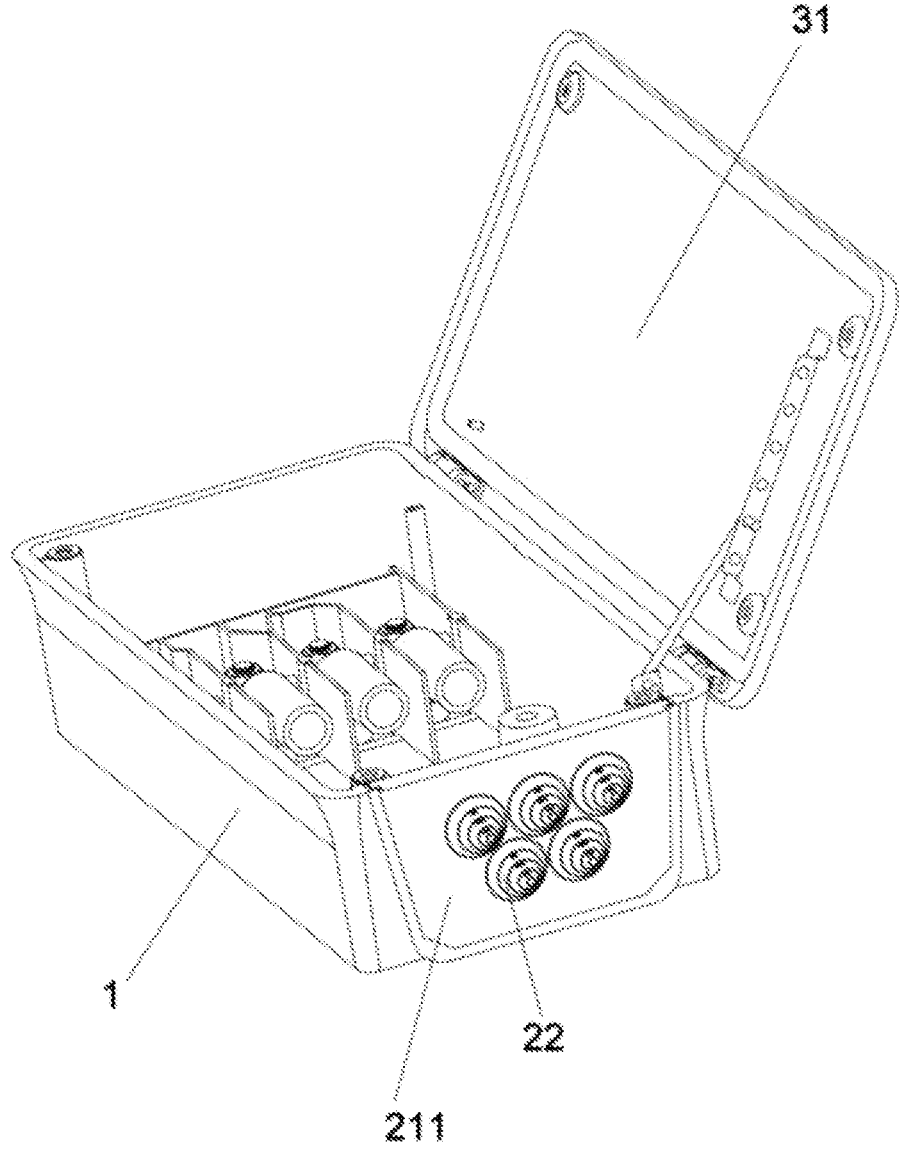
FIG. 2 is a second schematic structural diagram of the threading sealing box according to Embodiment 1 of the present application.

As shown in FIGS. 1 and 2, a threading sealing box is provided according to Embodiment 1, which is used for mounting and protecting a cable connector. The threading sealing box includes a box body 1 and a threading assembly 2. The box body 1 has an opening to facilitate wiring and other operations in the box body 1. A side wall of the box body 1 has a mounting slot 11. When the threading sealing box is installed in an application scenario, the mounting slot 11 is usually located at the bottom of the box body 1. The threading assembly 2 includes a threading plate assembly 21 and a threading body 22. The threading plate assembly 21 is slidably disposed in the mounting slot 11 to slide in or out of the mounting slot 11. The threading plate assembly 21 has a threading hole 212. The threading body 22 is arranged on the threading plate assembly 21 and is located on an outer side of the box body 1. The threading body 22 is communicated with the threading hole 212. The threading body 22 can circumferentially seal a cable passing through the threading body 22, effectively reducing the risk of water leakage. There is no need to use a waterproof terminal and other accessories to lock the cable. The operation is simple and the mounting space is small. More cables can be mounted in the same space, effectively reducing the wiring cost of the cable. When maintenance and disassembly are required, the threading assembly 2 can be moved out of the box body 1 along the mounting slot 11, and the cable can be removed without lifting the machine, thereby reducing carrying and lifting operations and saving labor costs.

As shown in FIG. 1, in order to seal the box body 1, the threading sealing box further includes a cover plate 31. The cover plate 31 covers the opening of the box body 1. Specifically, one end of the cover plate 31 is hinged with a side wall of the box body 1 that is not provided with the mounting slot 11, so as to open or close the threading sealing box. A seal 32 is provided on one side, corresponding to an interior of the box body 1, of the cover plate 31. After the cover plate 31 covers the box body 1, the seal 32 is filled between the cover plate 31 and side walls of and the box body 1 to seal the box body 1, which prevents water and dust from entering the threading sealing box. In other embodiments, the cover plate 31 is not limited to being hinged with the box body 1. The cover plate 31 may be directly covered on the box body 1 or removed from the box body 1.

It should be noted that, the cover plate 31 is required to be opened at a certain angle during the wiring operation. For the convenience and safety of operation, a positioning structure is provided to fix the cover plate 31 at a required position.

Specifically, a first positioning plate 33 is provided on the cover plate 31. Multiple first positioning holes 331 are formed along a width direction of the cover plate 31. A second positioning plate 12 is correspondingly provided in the box body 1. A second positioning hole 121 is formed at an end of the second positioning plate 12. In addition, a positioning pin 34 is provided. One end of the positioning pin 34 is inserted into the second positioning hole 121. The other end of the positioning pin 34 is inserted into a corresponding second positioning hole 331 according to opening and closing degree of the cover plate 31. The positioning pin 34 is in an inserting-fit with the first positioning hole 331 and the second positioning hole 121, so the cover plate 31 is fixed at a certain opening and closing position, thereby facilitating the operator to perform wiring operation and preventing the operator from being hurt by the shaking of the cover plate 31. When the opening and closing angle of the cover plate 31 is required to be adjusted, the other end of the positioning pin 34 may be adjusted to be an inserting-fit with a different first positioning hole 331.

The structure of the threading plate assembly 21 is described below with reference to FIGS. 1 and 2. As shown in FIG. 1, the threading plate assembly 21 includes a threading plate body 211 and a threading hole 212. As shown in FIG. 2, the threading plate body 211 is slidably arranged in the mounting slot 11. The threading body 22 is arranged on the threading plate body 211 and completely covers the threading hole 212.

Figure 3:
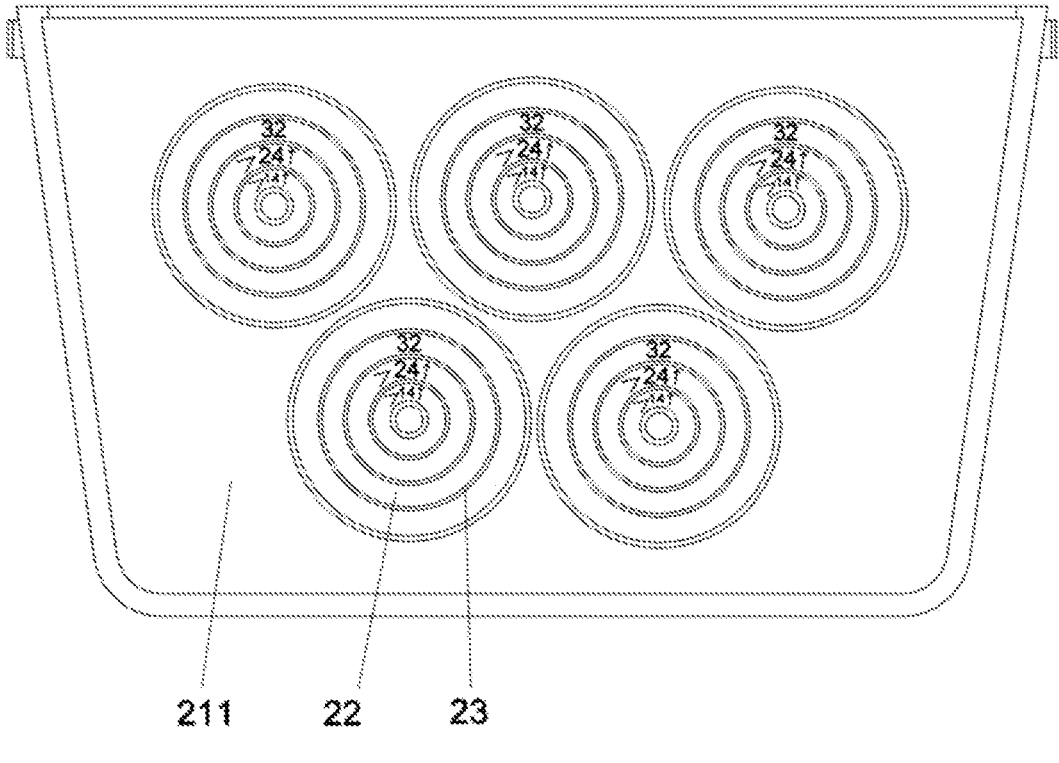
FIG. 3 is a schematic structural diagram of a threading assembly according to Embodiment 1 of the present application.
Figure 4:
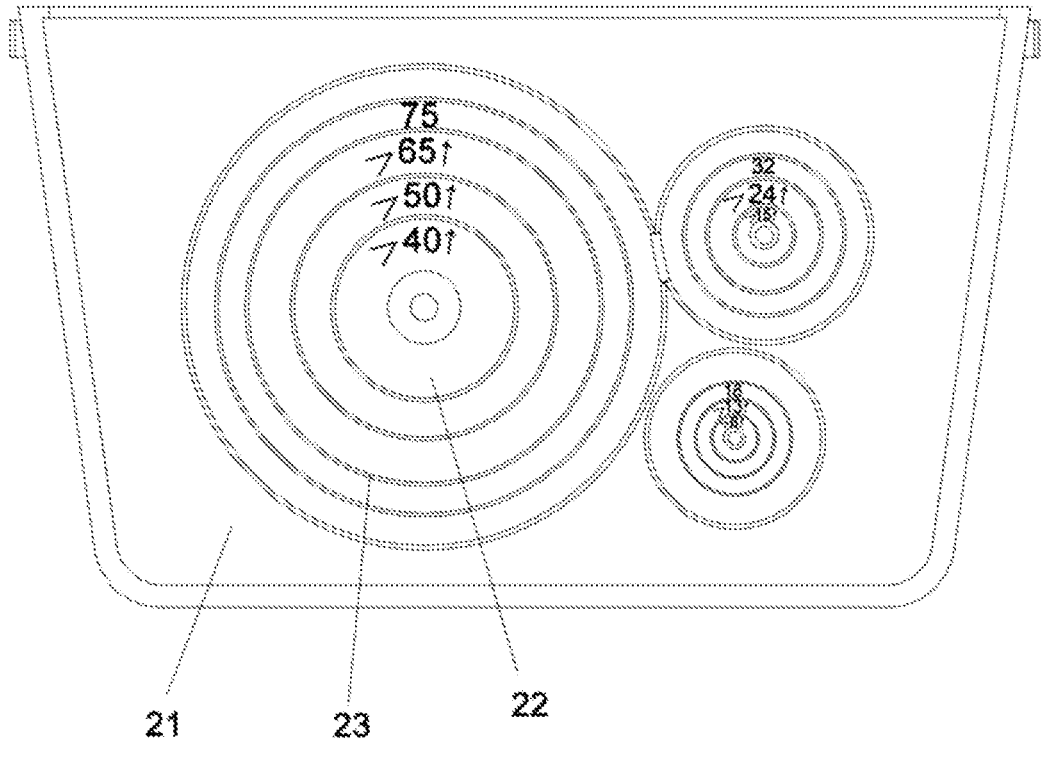
FIG. 4 is a schematic structural diagram of another threading assembly according to Embodiment 1 of the present application.

In an embodiment, multiple threading holes 212 are formed on the threading plate assembly 21. Each of the multiple threading holes 212 is provided with one threading body 22 correspondingly. One cable may pass through each threading body 22. In this embodiment, as shown in FIG. 3, five threading holes 212 of the same size are formed in the threading plate body 211, and five threading bodies 22 correspondingly provided are also of the same size. Alternatively, diameters of an end, which is close to the threading plate assembly 21, of at least two threading bodies 22 of the multiple threading bodies 22 are different. The diameter of the end, which is close to the threading plate assembly 21, of the threading body 22 is greater than a diameter of the corresponding threading hole 212. As shown in FIG. 4, the number of the threading bodies 22 is three, and sizes of the three threading bodies 22 are different. The number of the threading bodies 22 may be reasonably set according to the sizes of the threading plate body 211 and the threading body 22. The number and size of the threading bodies 22 are not limited.

In order to enable a single threading body 22 to adapt to cables with multiple wire diameters, as shown in FIG. 1, the threading body 22 is of a conical shape, which gradually converges from an end close to the threading plate body 211 to an end away from the threading plate body 211, and is closed at the end to form a sealing end. The sealing is formed between the threading body 22 and the threading plate body 211. During the threading, the sealing end of the corresponding threading body 22 is punctured or cut according to the diameter of the threading required. The diameter of the cut hole is slightly smaller than the diameter of the cable, so that the cable can pass through the cut hole, and the cable is covered by the threading body 22. The threading body 22 may be made of an elastic material such as rubber.

In an embodiment, as shown in FIGS. 3 and 4, a locking line ring 23 is provided on an outer periphery of the threading body 22. The locking line ring 23 protrudes outward from an outer wall of the threading body 22. The locking line ring 23 is elastic and can strengthen the locking strength of the cable to prevent excessive tearing. The threading body 22 is also provided with an identification of a wire diameter range applicable to the locking line ring 23. User can cut along an upper edge of a corresponding locking line ring 23 according to the diameter requirements of the cable. When the cable is inserted, the locking line ring 23 can hold the cable tightly and has a certain holding force on the cable, thereby achieving sealing and protection.

Specifically, at least two locking line rings 23 are provided. All of the locking line rings 23 are distributed along an axial direction of the threading body 22, that is, the threading body 22 can be cut at different positions according to different cable diameters. Different locking line rings 23 can lock and seal wires of different diameters.

The identification has been provided for the cable diameter range applicable to each locking line ring 23. As shown in FIG. 3, five threading bodies 22 of the same size are provided on the threading plate body 211. Three locking line rings 23 are provided on each threading body 22. The range of an applicable cable diameter L is: 14 mm$<$L$\leq$32 mm. Specifically, the range of the cable diameter L applicable to a locking line ring 23 with a smallest diameter is 14 mm$<$L$\leq$24 mm. The range of the cable diameter L applicable to the locking line ring 23 in the middle is 24 mm$<$L$\leq$32 mm. Usually, a locking line ring 23 with a largest diameter does not need to be cut, which strengthens the support strength of the threading body 22. The upper edge of the locking line ring 23 with the largest diameter also is cut according to requirements, so that the range of the cable diameter applicable to the threading body 22 is enlarged, and the locking and sealing effect of the locking line ring 23 on the cable can also be achieved. In the case that the sizes of the threading bodies 22 arranged on the threading plate body 211 are different, the operation principle is the same as the operation principle in the situation that when the sizes of the threading body 22 is the same. As shown in FIG. 4, three threading bodies 22 of different sizes are provided on the threading plate body 211. A largest threading body 22 is provided with four locking line rings 23. The range of the applicable cable diameter L is 40 mm$<$L$\leq$75 mm. The ranges of the cable diameter L applicable to the locking line rings 23 are 40 mm$<$L$\leq$50 mm, 50 mm$<$L$\leq$65 mm, and 65 mm$<$L$\leq$75 mm, respectively. Another threading body 22 is provided with three locking line rings 23. The ranges of the cable diameter L applicable to the locking line rings 23 are 15 mm$<$L$\leq$24 mm and 24 mm$<$L$\leq$32 mm, respectively. The smallest threading body 22 is provided with three locking line rings 23. The ranges of the cable diameter L applicable to the locking line rings 23 are 8 mm$<$L$\leq$13 mm and 13 mm$<$L$\leq$18 mm, respectively. It should be noted that the number and applicable diameter range of the locking line ring 23 are not limited by the above, and may be set according to actual requirements.

Figure 5:
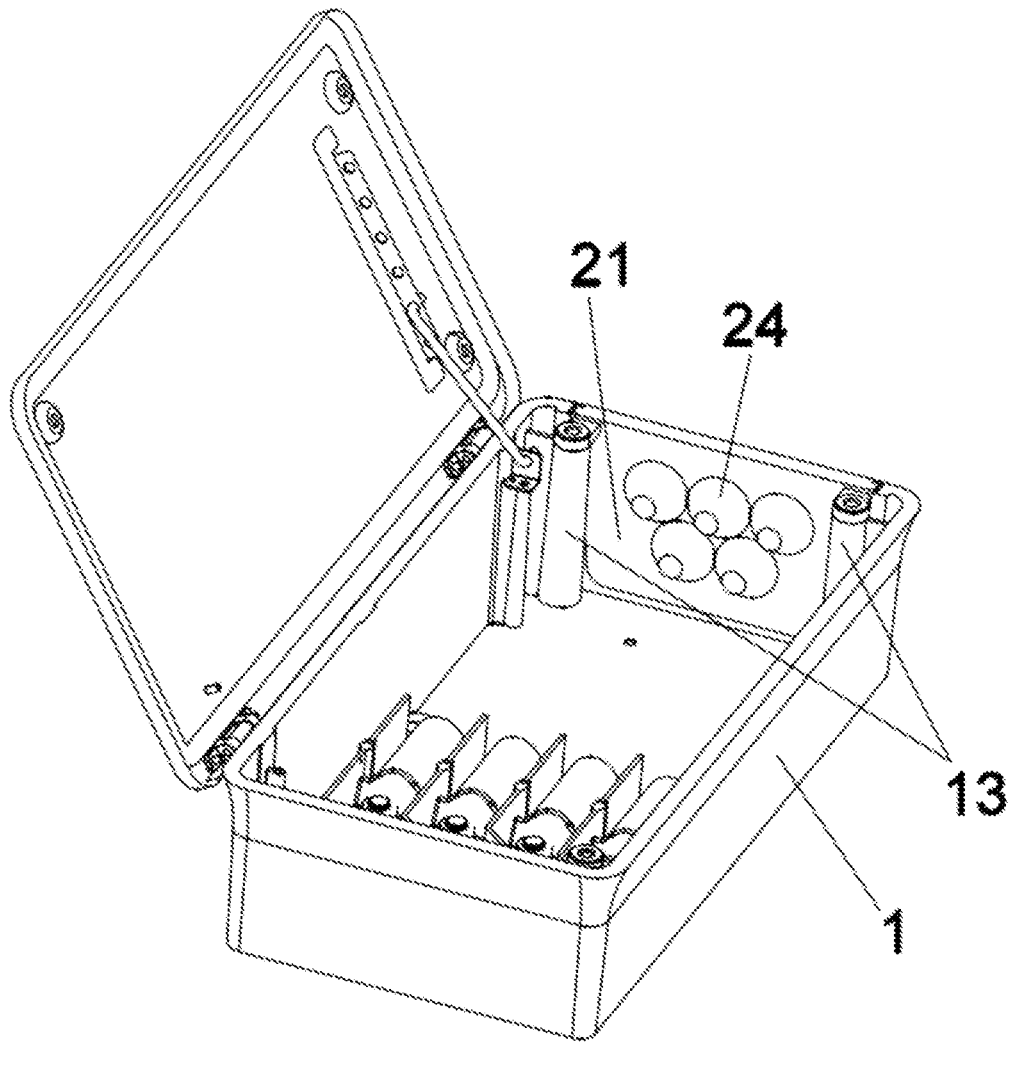
FIG. 5 is a schematic diagram of an internal structure of the threading sealing box according to Embodiment 1 of the present application.

Further, as shown in FIG. 5, the threading assembly 2 further includes a sealing sleeve 24. The sealing sleeve 24 is arranged on the threading plate assembly 21 and is located on an inner side of the box body 1. The sealing sleeve 24 corresponds to the threading body 22 and is communicated with the threading body 22. The diameter of the sealing sleeve 24 gradually decreases from an end close to the threading plate assembly 21 to an end away from the threading plate assembly 21. The sealing sleeve 24 further locks and seals the cable, so that the cable is sealed more stably. The sealing sleeve 24 is made of an elastic material such as rubber, and the locking and sealing effect is better. In other embodiments, the threading body 22 may also be arranged on the inner side of the box body 1, and the sealing sleeve 24 may be arranged on the outer side of the box body 1, which can also lock and seal the cable.

Further, the threading plate body 211 includes a threading plate body skeleton and a coating layer. The coating layer is wrapped on an outer surface of the threading plate body skeleton. The coating layer is integrally formed with the threading body 22 and the sealing sleeve 24. The integrated structural design makes the connection between the threading body 22 and the sealing sleeve 24 and the coating layer stronger, and no other structural components are required for assembly, which is more convenient to operate.

Further, as shown in FIG. 1, two connectors 13 are provided in the box body 1. The two connectors 13 are located on both sides of the mounting slot 11. A first threaded hole is formed at an end of each of the connectors 13. Two bumps 214 are provided at an upper end of a side, which faces the interior of the box body 1, of the threading plate body 211. A second threaded hole is formed in each of the two bumps 214. After the threading assembly 2 is mounted in the mounting slot 11, the first threaded hole and the second threaded hole are coaxially aligned. A protrusion 35 is correspondingly provided on an inner side of the cover plate 31. A third threaded hole is formed in the protrusion 35. When the cover plate 31 is covered, the first threaded hole, the second threaded hole, and the third threaded hole form threaded cavities with the same diameter. A bolt or screw is screwed into the threaded cavity from the outer side of the box body 1, thereby fixing the cover plate 31 at the opening of the box body 1 to seal the box body 1. Meanwhile, the threading assembly 2 is fixed in the mounting slot 11 to prevent the threading assembly 2 from sliding to affect the stability of cable connectors. A gasket 215 is also provided between the bump 214 and the protrusion 35, which can prevent abrasion generated by direct contact between the bump 214 and the protrusion 35, and a certain sealing effect is achieved.

Embodiment 2

Figure 6:
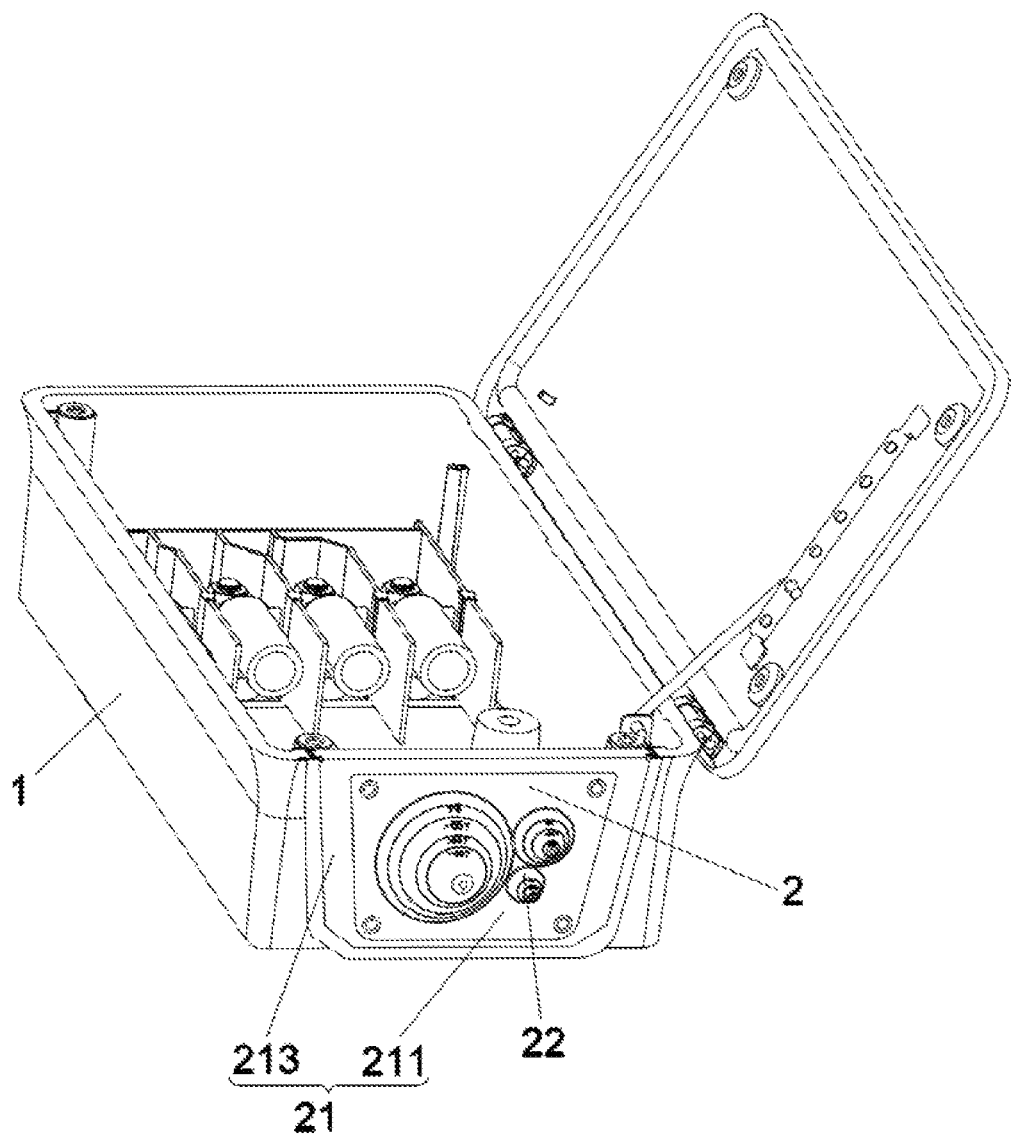
FIG. 6 is a schematic structural diagram of a threading sealing box according to Embodiment 2 of the present application.
Figure 7:
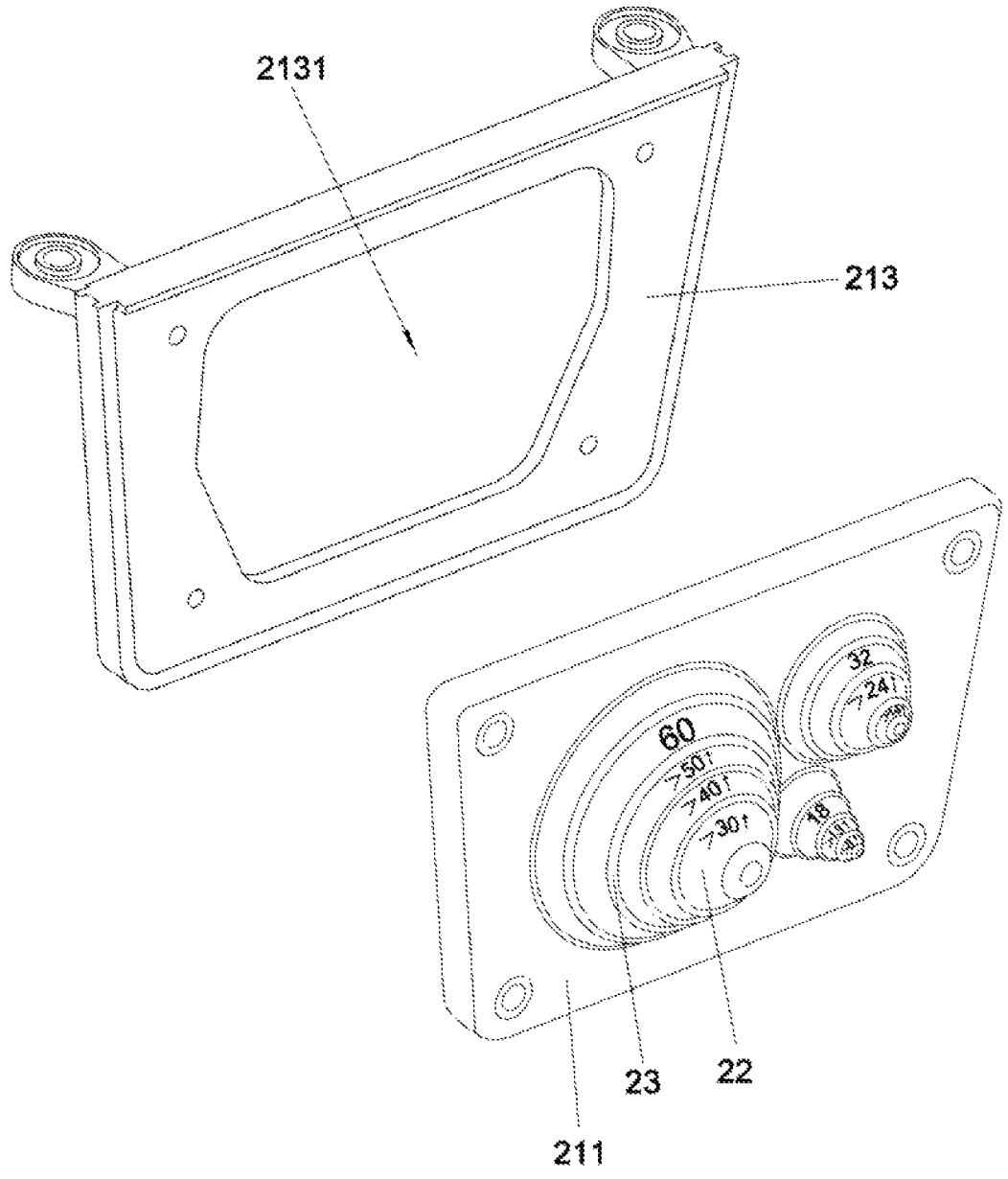
FIG. 7 is a schematic diagram of a splitting structure of a threading plate assembly according to Embodiment 2 of the present application.

As shown in FIGS. 6 to 7, a threading sealing box is provided according to this embodiment, which differs from Embodiment 1 in that the structure of the threading plate assembly 21 in this embodiment is different. In Embodiment 1, the threading plate body 211 is slidably arranged in the mounting slot 11. In embodiment 2, as shown in FIG. 6, the threading plate assembly 21 includes a mounting plate 213 and a threading plate body 211. The mounting plate 213 is slidably arranged in the mounting slot 11. As shown in FIG. 7, a through hole 2131 is formed in the mounting plate 213. The threading plate body 211 is mounted on the mounting plate 213 and is arranged corresponding to the through hole 2131. The threading body 22 is arranged on the threading plate body 211. The threading body 22 and the sealing sleeve 24 are arranged corresponding to the through hole 2131, so that the cable can pass through the threading body 22, the sealing sleeve 24, and the through hole 2131 and extend into the box body 1.

Specifically, threaded holes are formed in the mounting plate 213 and the threading plate body 211. The mounting plate 213 and the threading plate body 211 are connected together through a screw connection. Alternatively, other manners may also be used, as long as the mounting plate 213 and the threading plate body 211 can be tightly connected, which is not limited.

Further, each of the mounting plate 213 and the threading plate body 211 includes a coating layer. The coating layer is made of an elastic material such as rubber. When the mounting plate 213 and the threading plate body 211 are pressed together, the coating layer plays a sealing role.

According to the threading sealing box provided by the embodiments, the requirements of cables of different sizes can be met only by replacing the threading plate body 211 with threading bodies 22 of different sizes without replacing the mounting plate 213, effectively reducing production costs.

Apparently, the embodiments of the present application are only examples for clearly illustrating the present application, and are not intended to limit the embodiments of the present application. For those skilled in the art, various obvious changes, readjustments, and substitutions can be made without departing from the protection scope of the present application. An exhaustive list of all implementations is neither necessary nor possible. Any modifications, equivalent replacements and improvements made within the spirit and the principles of the present application shall be included within the protection scope of the claims of the present application.

What is claimed is:

1. A threading sealing box, comprising:
   a box body having an opening, wherein a mounting slot is formed in a side wall of the box body; and
   a threading assembly comprising a threading plate assembly and a threading body, wherein the threading plate assembly is slidably arranged in the mounting slot to slide in or out of the mounting slot, a threading hole is formed in the threading plate assembly, the threading body is arranged on the threading plate assembly, the threading body is located at the threading hole, and the threading body is configured to circumferentially seal a cable passing through the threading body,
   wherein the threading assembly further comprises a sealing sleeve, the sealing sleeve is arranged on the threading plate assembly, one of the threading body and the sealing sleeve is arranged on an outer side of the box body, the other of the threading body and the sealing sleeve is arranged on an inner side of the box body, the sealing sleeve corresponds to the threading body and is communicated with the threading body, a diameter of the sealing sleeve gradually decreases from an end close to the threading plate assembly to an end away from the threading plate assembly.

2. The threading sealing box according to claim 1, wherein the threading body is of an end sealing structure, and a diameter of the threading body gradually decreases from an end close to the threading plate assembly to an end away from the threading plate assembly.

3. The threading sealing box according to claim 2, wherein a locking line ring is provided on an outer periphery of the threading body, and the locking line ring is elastic.

4. The threading sealing box according to claim 3, wherein the number of the locking line ring is at least two, and the at least two locking line rings are distributed along an axial direction of the threading body.

5. The threading sealing box according to claim 1, wherein a plurality of threading holes are formed in the threading plate assembly, and each of the plurality of threading holes is provided with one threading body correspondingly.

6. The threading sealing box according to claim 5, wherein diameters of an end, which is close to the threading plate assembly, of at least two threading bodies of the plurality of threading bodies are different, and the diameter of the end, which is close to the threading plate assembly, of the threading body is greater than a diameter of the corresponding threading hole.

7. The threading sealing box according to claim 1, wherein the threading plate assembly comprises a threading plate body, the threading plate body is slidably arranged in the mounting slot, and the threading body is arranged on the threading plate body.

8. The threading sealing box according to claim 1, wherein the threading plate assembly comprises:

a mounting plate, slidably arranged in the mounting slot, wherein a through hole is formed in the mounting plate; and a threading plate body, mounted on the mounting plate and corresponding to the through hole, wherein the threading body is arranged on the threading plate body.

9. The threading sealing box according to claim 7, wherein the threading plate body comprises:

a threading plate body skeleton; and a coating layer, wrapped on an outer surface of the threading plate body skeleton, wherein the coating layer is integrally formed with the threading body and the sealing sleeve.

10. The threading sealing box according to claim 1, further comprising:

a cover plate, covering the opening of the box body.

11. The threading sealing box according to claim 8, wherein the threading plate body comprises:

a threading plate body skeleton; and a coating layer, wrapped on an outer surface of the threading plate body skeleton, wherein the coating layer is integrally formed with the threading body and the sealing sleeve.

12. The threading sealing box according to claim 2, further comprising:

a cover plate, covering the opening of the box body.

13. The threading sealing box according to claim 3, further comprising:

a cover plate, covering the opening of the box body.

14. The threading sealing box according to claim 4, further comprising:

a cover plate, covering the opening of the box body.

15. The threading sealing box according to claim 5, further comprising:

a cover plate, covering the opening of the box body.

16. The threading sealing box according to claim 6, further comprising:

a cover plate, covering the opening of the box body.

17. The threading sealing box according to claim 7, further comprising:

a cover plate, covering the opening of the box body.

18. The threading sealing box according to claim 8, further comprising:

a cover plate, covering the opening of the box body.

* * * * *